(12) United States Patent
Branton et al.

(10) Patent No.: US 9,202,020 B2
(45) Date of Patent: Dec. 1, 2015

(54) FILE PROTECTION USING SESSION-BASED DIGITAL RIGHTS MANAGEMENT

(75) Inventors: Paul K. Branton, Rochdale (GB);
Anthony T. Davis, Lancashire (GB);
Richard Pointon, Church Lawton (GB);
Richard J. Somerfield, Cheshire (GB)

(73) Assignee: AppSense Limited, Warrington (GB)

( * ) Notice: Subject to any disclaimer, the term of this patent is extended or adjusted under 35 U.S.C. 154(b) by 651 days.

(21) Appl. No.: 13/590,554

(22) Filed: Aug. 21, 2012

(65) Prior Publication Data

US 2014/0059344 A1 Feb. 27, 2014

(51) Int. Cl.
| | |
|---|---|
| H04L 29/06 | (2006.01) |
| G06F 21/10 | (2013.01) |
| G06F 21/60 | (2013.01) |
| G06F 21/62 | (2013.01) |
| H04L 12/40 | (2006.01) |
| G06F 12/14 | (2006.01) |

(52) U.S. Cl.
CPC .............. *G06F 21/10* (2013.01); *G06F 21/606* (2013.01); *G06F 21/6236* (2013.01); *G06F 12/14* (2013.01); *G06F 2221/0755* (2013.01); *G06F 2221/2107* (2013.01); *G06F 2221/2111* (2013.01); *G06F 2221/2113* (2013.01); *H04L 12/40104* (2013.01)

(58) Field of Classification Search
CPC ... G06F 12/10; G06F 21/6263; G06F 21/606; G06F 2221/2107; G06F 2221/0755; G06F 2221/2113; G06F 2221/2111; G06F 12/14; H04L 12/40104
IPC ....................................................... G06F 21/10
See application file for complete search history.

(56) References Cited

U.S. PATENT DOCUMENTS

| | | | |
|---|---|---|---|
| 2010/0110465 A1* | 5/2010 | Ferlitsch et al. | 358/1.13 |
| 2011/0040967 A1* | 2/2011 | Waller et al. | 713/161 |
| 2011/0197280 A1* | 8/2011 | Young et al. | 726/24 |

\* cited by examiner

*Primary Examiner* — Krisna Lim
(74) *Attorney, Agent, or Firm* — Wilmer Cutler Pickering Hale and Dorr LLP

(57) ABSTRACT

Systems and methods are provided for encrypting electronic files during a transfer to a low-security storage location is provided. In one embodiment, a method comprises receiving a file copy request for a file stored on a source storage system to be copied to a destination storage system; determining a desired file security level of the file based on a desired security level for the file when the file is accessed; determining a destination security level of the destination storage system; comparing the file security level and the destination security level; encrypting the file to create an encrypted file when the destination security level is less than the file security level prior to copying the file; and copying at least one of the file and the encrypted file to the destination storage system as a function of the comparison of the file security level and the destination security level.

20 Claims, 9 Drawing Sheets

FILE PROTECTION USING SESSION-BASED DIGITAL RIGHTS MANAGEMENT

BACKGROUND

Traditionally, corporate files and resources have been managed and controlled via a perimeter based security model—where only authorized information is able to cross the perimeter. However, with the proliferation of devices, technologies, and services that make it easier to transport data, the perimeter model becomes increasingly hard (if not impossible) to maintain.

One way some companies maintain a perimeter model is via physical segregation. For example, most (if not all) security sensitive organizations, will maintain two physically separate infrastructures; an internal only infrastructure, and an externally connected infrastructure (with limited availability). Provided they are able to manage the human element, this arrangement can be successful in maintaining the perimeter model.

Most organizations, however, are unable to maintain a physical separation—both from a need and human-convenience perspective. Most, if not all, of the devices used within an organization have easy access to un-managed resources (i.e. personal USB sticks/devices, the internet, etc. . . . ). In these instances, some organizations often unsuccessfully try to maintain the perimeter model. Within this model, there is a continual conflict between convenience and security—often exacerbated by their users exploring new un-managed services. Unmanaged/Third Party refers to services that are outside of the control of the employees' organization.

One recent key shift in this regard is with the use of cloud storage platforms (e.g., Dropbox) within the corporate environment. Employees feel the benefits of these platforms outweight the costs, and in particular, in a global working environment, often the traditional forms of communication are insufficient (e.g., Email file size limits).

These un-managed services will often provide legitimate additional capabilities required (and desired) by the organization and their users.

Based on the above, many organizations wish to extend the services and capabilities available to their users, but need to ensure that only authorized users are able to access sensitive information, even though the information no longer resides within the organization's perimeter.

SUMMARY

In one embodiment, a computerized method for encrypting electronic files during a transfer to a low-security storage location is provided. The method comprises receiving a file copy request for a file stored on a source storage system to be copied to a destination storage system, determining a desired file security level of the file, the file security level is based on a desired security level for the file when the file is accessed, determining a destination security level of the destination storage system, comparing the file security level and the destination security level, encrypting the file to create an encrypted file when the destination security level is less than the file security level prior to copying the file, and copying at least one of the file and the encrypted file to the destination storage system as a function of the comparison of the file security level and the destination security level.

The computerized method can also comprise one or more of the steps of: determining the destination security level of the destination storage system based on whether the destination storage system is connected to an enterprise network within an enterprise network firewall, determining the destination security level of the destination storage system based on whether the destination storage system is within a secure network circumscribed by a security threshold boundary; determining the file security level of the file based on a default security level of the source storage system; and encrypting the file using a session-based encryption method.

In another embodiment, an authentication server for encrypting electronic files during a transfer to a low-security storage location is provided. The authentication server comprises a processor and a memory coupled to the processor and including computer-readable instructions that, when executed by the processor, cause the processor to: receive, from a user device, a request to copy a file to the user device from a file server; determine a file security level of the file based on a desired security level for the file when the file is accessed; determine a destination security level of the user device; encrypt the file to create an encrypted file when the destination security level is less than the file security level prior to copying the file; and copy at least one of the file and the encrypted file to the user device as a function of the destination security level.

The computer-readable instructions can also further cause the processor to perform one or more functions, including: determining the destination security level of the destination storage system based on whether the destination storage system is connected to an enterprise network within an enterprise network firewall, determining the destination security level of the destination storage system based on whether the destination storage system is within a secure network circumscribed by a security threshold boundary; determining the file security level of the file based on a default security level of the source storage system; and encrypting the file using a session-based encryption method.

In another embodiment, a computerized method for providing session-based encryption for secure electronic files using a network server on a secure network is provided. The method comprises encrypting a file body within a file stored in the secure network using a first key; encrypting a file header within the file using a second key, wherein the file header contains the first key; creating an encrypted version of the file containing the encrypted file body and the encrypted file header; and providing the encrypted version of the file to a user device; providing decryption information to the user device such that the user device can access the file by decrypting the encrypted file header using the second key and decrypting the encrypted file body using the first key stored in the decrypted file header.

The computerized method can also comprise one or more of the steps of: sending a request to the user device from the network server to prompt a user to enter a passphrase; generating the second key based on the received passphrase; and encrypting the file header using the second key based on the received passphrase, such that the encrypted file header is decrypted using the second key and such that the second key is generated at the user device. The received passphrase may be stored at the server, and access to the stored passphrase may require the user to perform at least one authentication step.

The computerized method may also comprise one or more of the steps of: requesting, subsequent to authentication by the user, a new passphrase; decrypting the encrypted header using the stored passphrase; re-encrypting the decrypted header with the new passphrase; and transmitting the re-encrypted header to the user device, such that changing a user-generated passphrase for the encrypted file can be performed for use in an offline mode. Intercepting file access requests at the user device to transparently decrypt files may also be provided in an offline mode.

The computerized method can also comprise one or more of the steps of: storing the second key at the network server; establishing an authenticated session with the user device over a network; in response to a request for the second key, copying the second key to the user device over the authenticated session; and removing the copy of the second key from the user device subsequent to using the second key for decrypting the encrypted version of the file, such that decryption of the encrypted version of the file requires a session to be established with the network server over the network. The user may be required to authenticate each time the authenticated session is timed out, thereby requiring the user to maintain an active session with the network server in order to access the file contents. A destination security level of the user device may be determined based on whether the user device is connected to an enterprise network within an enterprise network firewall, and requiring encryption based on the destination security level of the user device. The destination security level of the user device may be determined based on whether the user device is within a secure network circumscribed by a security threshold boundary. The file security level of the file may be determined based on a default security level.

Various aspects of the invention can provide one or more of the following capabilities. Individual files can be secured using a resource-based model. Files can be shared without the use of a perimeter model. Files can be shared without explicit provisioning of per-file security levels. Files can be shared without applying digital rights management (DRM) encapsulation or encryption when sharing files between secure locations, and files can be shared to non-secure locations using automatic DRM encapsulation. DRM-encrypted files can be shared in an online mode requiring a session to be established with a server prior to decryption. As well, DRM-encrypted files can be shared in an offline mode that does not require a connection to a server to be established prior to decryption.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
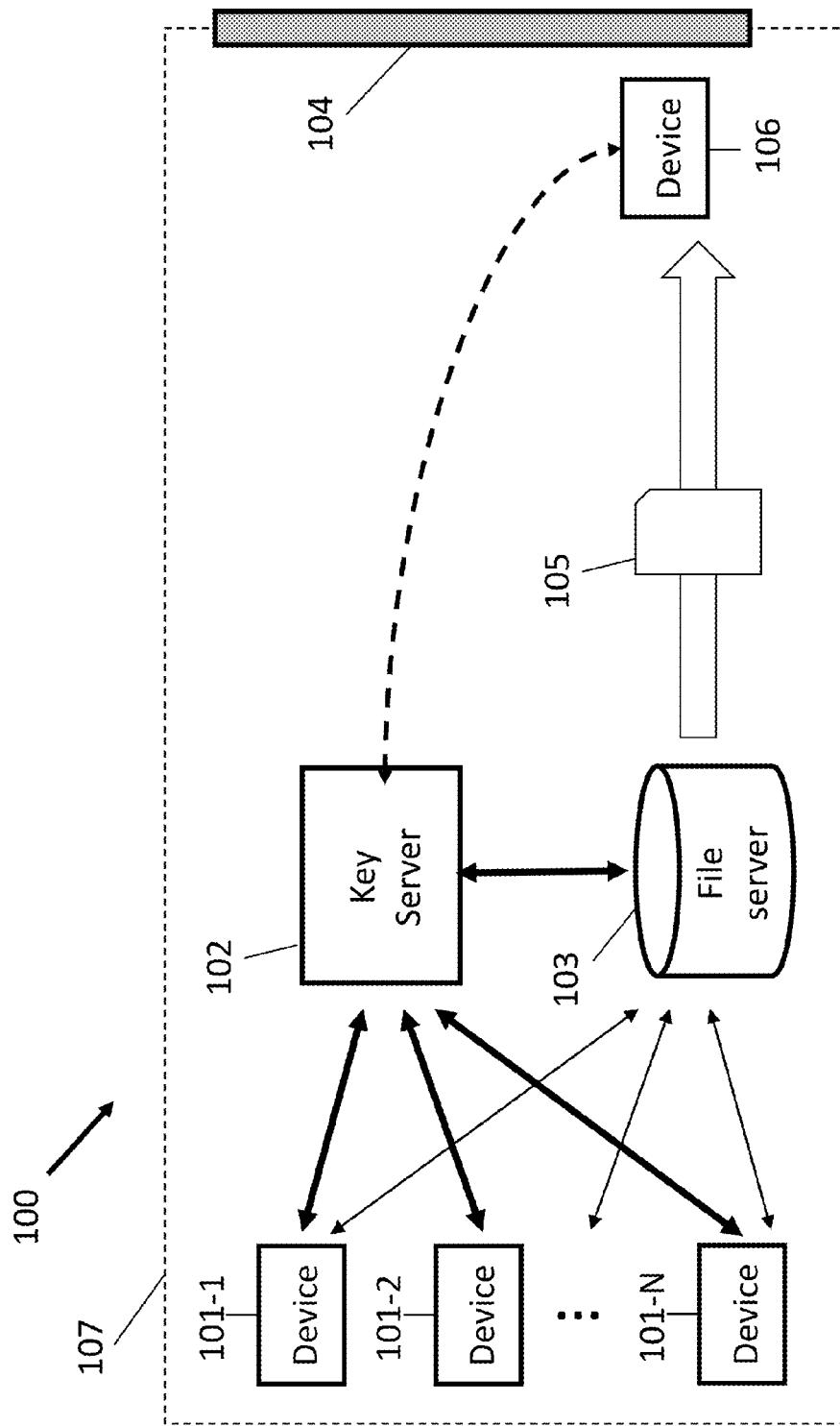
FIG. 1 is an exemplary network connectivity diagram of a networked system.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Embodiments described herein provide techniques for providing encryption on files that are transferred in a networked computer system. The encryption can be automatically applied when files are copied to locations that are designated insecure. The encryption can be provided in an online more or an offline mode. Other embodiments are within the scope of the invention.

The disclosed techniques can provide the capability to dynamically apply digital rights management (DRM) to files, and to provide either system-driven or user-driven key generation. These capabilities can enable a shift to resource security, rather than perimeter security. Resource security is typically a mechanism whereby each individual resource maintains its own perimeter security model, rather than having a single monolithic perimeter that attempts to contain all of the resources. This way, the location of the protected resource can become less significant. Even if the resources are stored in a publicly-accessible location, or even lost or leaked, the personal protection package (e.g., resource security perimeter) can maintain the desired security level. In this disclosure, the terms encrypted, secured, and protected can be used in roughly synonymous fashion.

File security is increasingly being tested due to the variety of storage mechanisms and the ease in which data can be moved between them. By allowing this transition to happen, but providing elevated security (where appropriate), embodiments of the disclosed subject matter can maintain a security level comparable to more traditional locked-down perimeter models, while also enabling data to be moved between devices with relative ease.

One concept in this disclosure is that ownership rights can be part of the resource security model. Essentially, a master owner is typically the organization, with individuals being granted access to the resource by, for example, the master owner. One purpose of this model can be to ensure that even if the resource is located on a personal device, the master owner has the ability to revoke access to that resource. This can be thought of as providing DRM for corporate resources, including files and access to other resources.

There are at least two functions described in this disclosure: i) Security Level Threshold Determination, and ii) Flexible DRM.

Embodiments of the disclosed subject matter can control when, where, and/or how DRM should be applied using, for example, a threshold. Each storage location (e.g., local, enterprise, and cloud) can have an associated security factor. This security factor can be used to determine whether a file is being moved across a boundary that exceeds the allowable threshold. For example, when a file is moved from a source storage location to a destination storage location, this can result in the file being moved across a security perimeter or boundary if the destination storage location that has insufficient security to ensure the protection of the file.

One factor considered by this algorithm can include the sensitivity of the file itself. For example, a highly sensitive file can be assigned a higher boundary (e.g., lower threshold) than a lower sensitivity file. The file itself can also have a security factor associated with it, which can be higher, the same, or lower than the storage platform's security factor. If the file does not have its own security factor, then it may inherit the present storage platform's security factor.

One aspect of the algorithm can be to determine whether the DRM system is required by performing a comparison between the file security factor and the destination storage security factor according to the following equation:

If Fs>Ds Then DRM Required where Fs=File Security Factor (e.g. the desired minimum security level of the file); Ss=Source Storage Security Factor (e.g. the security level provided by the source storage location); and Ds=Destination Storage Security Factor (e.g. the security level provided by the destination storage location). Fs can inherit Ss in cases when the Fs for a given file is not set individually. Ss may be used when determining whether DRM is required for files that do not have a file security factor Fs, as described below.

As a simple example, in some embodiments two security levels may be allowed, "0 (insecure)" and "1 (secure)." Suppose that a file is given a file security factor, Fs=1, of "secure." Suppose also that the file may be copied from a secure source location with security factor Ss=1, "(secure)" to an insecure location with security factor Ds=0, "insecure." In this case, since 1>0, Fs is greater than Ds, and the file may be encapsulated or encrypted by the system automatically prior to the file being stored on the destination system. Further embodiments may provide more than two security levels, such that any number of highly-secure security levels, e.g., "2 (more secure)," "3 (extremely secure)," "4 (super secure)," etc., may be provided.

The file may be assumed not to incorporate any DRM prior to the copy operation. In the case where DRM is not required, it is not necessary to add DRM to the file, and the file may be copied in its native form, as described below. In the case where DRM is already present on the file, an additional layer of DRM may be added in some embodiments as described below, in some embodiments. In other embodiments, DRM may not be added if a prior DRM layer is present on the file.

As a file is requested from the source, the source can determine whether DRM is required, and apply it before it reaches the end-point. Files that exist on a source but do not have a file security factor Fs may be assigned the source's security factor, Ss, so that if a file does not have an associated security factor when the system assesses whether DRM is required for the file, it can be assigned a security factor equal to the security factor of the source storage system. It is recommended that a high security source should not contain low security files, but it is not necessarily prevented. As well, if Fs is configured separately, then the specific value that is configured can be used to override the default value, that is, Ss.

The DRM system can include the following parts: i) A Secure (DRM) Header, and ii) Encrypted Data Body. Modifying a file to include the secure DRM header and encrypting the data body such that it constitutes an encrypted data body is referred to herein as "applying" DRM.

The Secure Header can be protected using public/private key encryption. In a public-key encryption scheme the header can be encrypted by a organization or user's public key, such that only users in possession of the organization or user's private key may decrypt the header. This can provide an initial level of protection, so that if the file is obtained by an unauthorized user, the unauthorized user will be unable to access the header.

The Secure Header can be protected because it stores a decryption key (a.k.a. a master key) for decrypting the encrypted data body, along with other information. As a prerequisite typically shared with all secure systems, the described system can require that the keys be stored securely. The decryption key can be a symmetric key. The file data can be encrypted using the master key, and the header and encrypted body can then concatenated together to construct a DRM-protected version of the file. The Encrypted Data Body can use a symmetric AES 256-bit key, or another well-known encryption algorithm. The passphrase to generate this key can either be generated manually (via the user), or automatically, so that the key can be created automatically by the system.

To decrypt the Encrypted Data Body in the online mode, a user that desires to open the file can be directed to a networked authentication server in order to decrypt the Secure Header. The authentication server can provide the necessary key to the user to decrypt the Secure Header, as described further below, and the decryption key found within the Secure Header can be used to decrypt the Encrypted Data Body.

To decrypt the Encrypted Data Body in the offline mode, the user typically must have access to the decryption key without contacting a network server. This can be done if the passphrase is known and/or provided by the user. In this case, the Secure Header can be bypassed and the Encrypted Data Body can be decrypted separately to the Secure Header. This mechanism also enables a passphrase recovery scheme. In the case that the user forgets the passphrase (which is used as the seed to generate the master key), then provided they can decrypt the Secure Header, the user can retrieve the master key and decrypt the file. The decrypted data can then be re-encrypted with a new known passphrase. Also, if the passphrase is known, it allows the file to be decrypted without needing to contact the server—for example when the device is offline. This provides an offline mode for the disclosure.

If Fs−Ds>Sensitive Threshold, then the passphrase can be generated securely by the server, and not exposed to the user.

The master key can be generated automatically, either in cases when the user has not provided a passphrase to the server, or when the server deems that the file must always have require central authorization before decryption, and therefore that the aforementioned bypass scheme and offline mode should be controlled/prevented. When the master key is generated automatically, the Encrypted Data Body is typically only available for decryption in the online mode.

The aforementioned public/private key pair can be generated for the requesting user, and both parts can be stored on the server (in a secure location) and the private key is securely transferred to the client for each session (and it is not cached/stored locally on the end-point). This way, if the server wishes to revoke access for the user, it stops transmitting the user's private key—therefore any protected files that already exist on the client cannot be decrypted.

The system can be driven by policies which allow the use of location information (amongst other contextual information) to determine the storage platform's security factor.

FIG. 1 is an exemplary network connectivity diagram of a networked system. Block diagram 100 shows an enterprise network environment. Dotted line 107 demarcates a secure part of the network that is behind firewall 104. Behind the firewall and within the protected area, key server 102 and file server 103 can provide enterprise services. Also on the secure network can be devices 101-1, 101-2, . . . 101-N and device 106. File 105 can be transferred from file server 103 to device 106. In this example, file server 103 is the source and device 106 is the destination of the transfer. The security level of file server 103 and device 106 can be determined by one or more factors, which in this case can include their respective locations within protected enterprise network 107, which can result in the determination of a high security level for both file server 103 and device 106. Since both the source and the target are located behind the firewall in the protected network 107, DRM is typically not applied. There is preferably no connection between key server 102 and device 106, because file 105 is transferred in an unprotected format (e.g., without DRM).

Device 101-1, 101-2 . . . 101-N can be, for example, a mobile device, a smartphone, a laptop, a desktop or other personal computer, or other user device. Device 106 can also be, for example, any of the above types of devices. A distinction can be drawn in some embodiments between mobile devices and fixed-location devices, such that mobile devices are designated as having a destination storage factor that indicates that the destination is insecure. This is because in some embodiments, mobile devices can move from within the enterprise network to outside the enterprise network. In contrast, fixed-location devices typically do not move and can be designated as either secure or insecure based on their location within the network.

Key server 102 can be a device running a server process that provides keys to requesting users. Key server 102 can be an authentication server. Key server 102 can provide keys as described herein, or can provide other keys or authentication tokens using other protocols such as Kerberos or Diameter. Key server 102 can provide services over Hypertext Transport Protocol Secure Sockets Layer (HTTP SSL) as a protocol, or can use another secure protocol. Key server 102 can be integrated with file server 103, or may be located on another server. File server 103 can use a common protocol such as WebDAV, Apple File Services (AFP), File Transport Protocol (FTP), Common Internet File Service (CIFS), or another service. File server 103 can provide a glue layer or middleware layer that informs key server 102 when a file is requested. File server 103 can also include a module or other functionality that informs key server 102 when a file is requested.

File 105 can be any type of commonly-understood file as known in the art. While a file has been discussed herein, a person of ordinary skill in the art will realize that the techniques described herein can also be applied to digital objects, music tracks or audio tracks, videos, emails, encapsulated documents, database entries, text snippets, HTML, Javascript, Javascript Object Notation (JSON) objects, or other similar digital content. One of ordinary skill in the art will also realize that the techniques described herein can also be applied to digital resources, such as network access tokens, printers or printer queues, access to file servers, access to application servers, and other resources.

Figure 2:
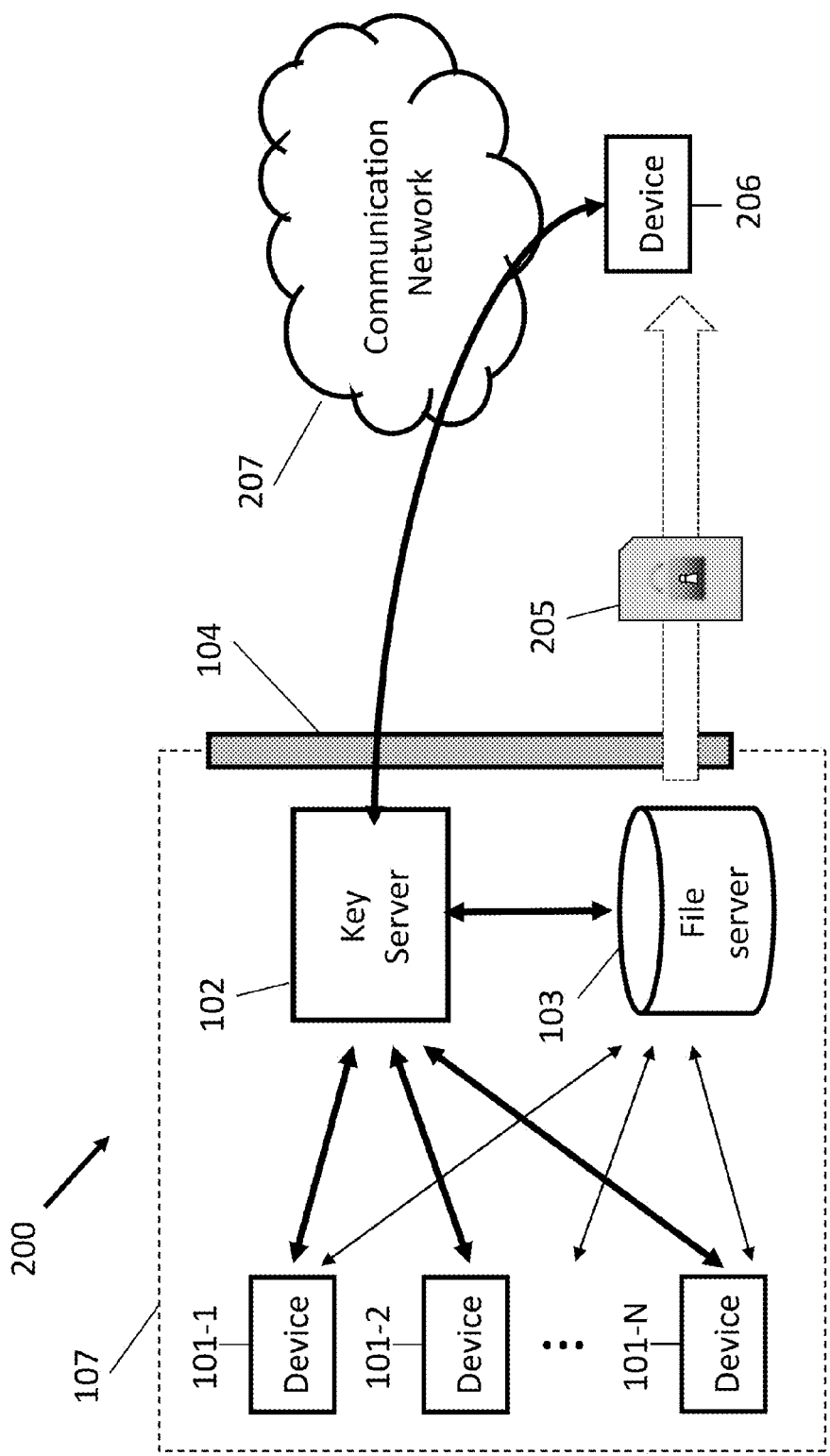
FIG. 2 is an exemplary network connectivity diagram of a networked system.

FIG. 2 is a further exemplary network connectivity diagram of a networked system. Dotted line 107 continues to demarcate the protected zone of the secure enterprise network. In this example, device 206 is located outside of enterprise network 107. Communication network 207 can be, for example, the public Internet. When device 206 desires file 205, the file can be transferred from file server 103 to device 206 through firewall 104, thereby exiting the protected zone of enterprise network 107. In this example, device 206 has a lower security level than file server 103. When the file is transferred outside of the protected zone, which can be to device 206, to a cloud storage service provider, or to any other location that is not directly under the control of the organization, DRM can thus be automatically applied in some embodiments. Device 206 preferably communicates with key server 102, as file 205 is protected with DRM. Communication with key server 102 can be through communication network 207 and firewall 104. In some embodiments, communication between key server 102 and file server 103 can enable automatic application of DRM.

Figure 3:
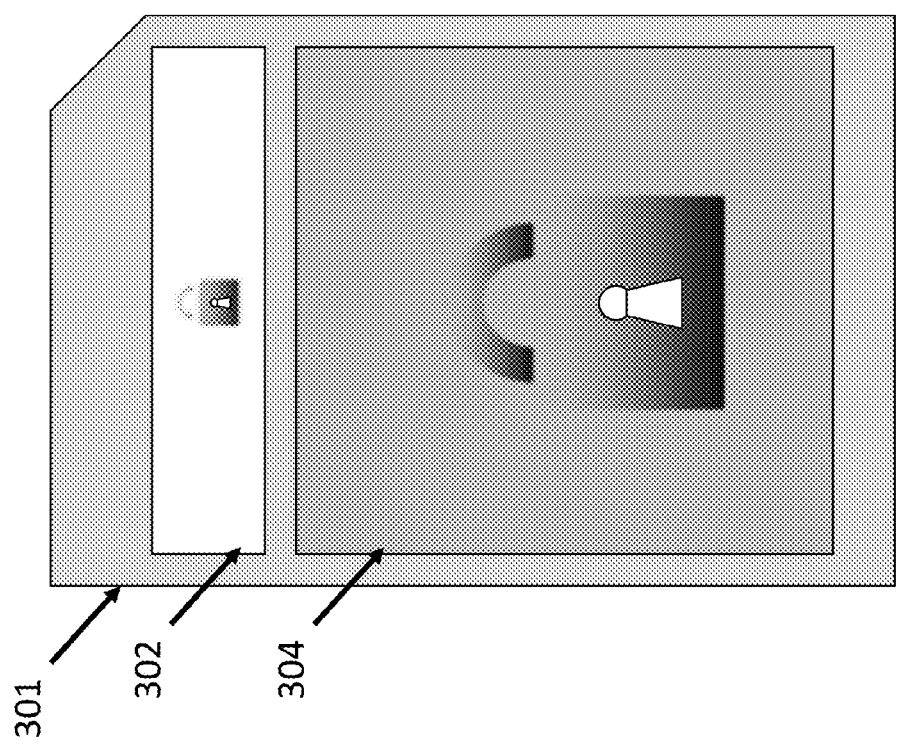
FIG. 3 is an exemplary schematic diagram of encryption applied to a digital file.

FIG. 3 is a schematic diagram of encryption applied to a digital file in accordance with some embodiments of the disclosure. Digital file 301 contains header 302 and body 304. Both header 302 and body 304 are encrypted in some embodiments. Body 304 can be encrypted with a key that in turn can be stored in header 302. In order to access file 301, device preferably must first obtain a decryption key for header 302, and then use the key stored in header 302 to decrypt body 304. In some embodiments, the decryption key for header 302 is provided in an online mode by key server 102. In some embodiments, this decryption key can be based on a session established with key server 102. In some embodiments, an off-line mode can also be enabled, wherein the decryption key for header 302 is known to the decrypting device.

Figure 4:
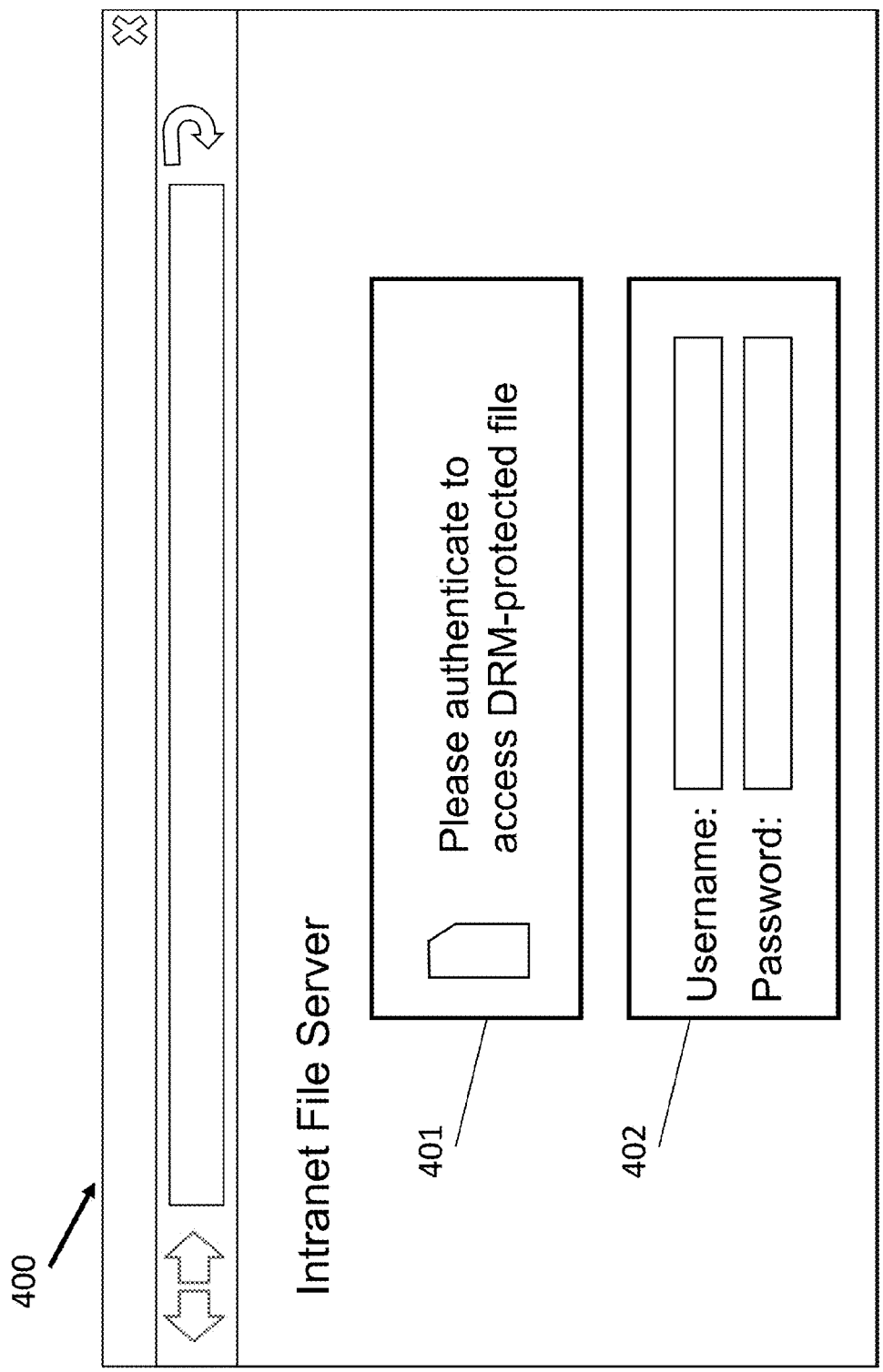
FIG. 4 is an exemplary schematic diagram of a web page used to provide an authentication session.

FIG. 4 is an exemplary schematic diagram of a web page that can be used to provide an authentication session in accordance with some embodiments of the disclosure. Web browser 400 displays an intranet webpage used for authenticating to key server 102. As this webpage is typically for accessing files protected by DRM, which normally occurs outside of the private enterprise network, the webpage can be delivered securely over a virtual private network (VPN) or secure socket layer (SSL) connection in some embodiments. The webpage can be served by a separate Web server (not shown) or directly by either key server 102 or fileserver 103, in some embodiments. The webpage can use session-based authentication. In rectangle 401, the webpage can identify a specific file and request the user to provide authentication information. In rectangle 402, the user can be presented with areas for entering username and password information. Alternative embodiments can also be contemplated in which a webpage is not used, or in which other authentication information or communication protocols are used. However, a webpage can be useful for providing session-based authentication using techniques known in the art. Once authenticated, a user can receive a session key (not shown) for decrypting the header of the DRM-protected document.

Figure 5:
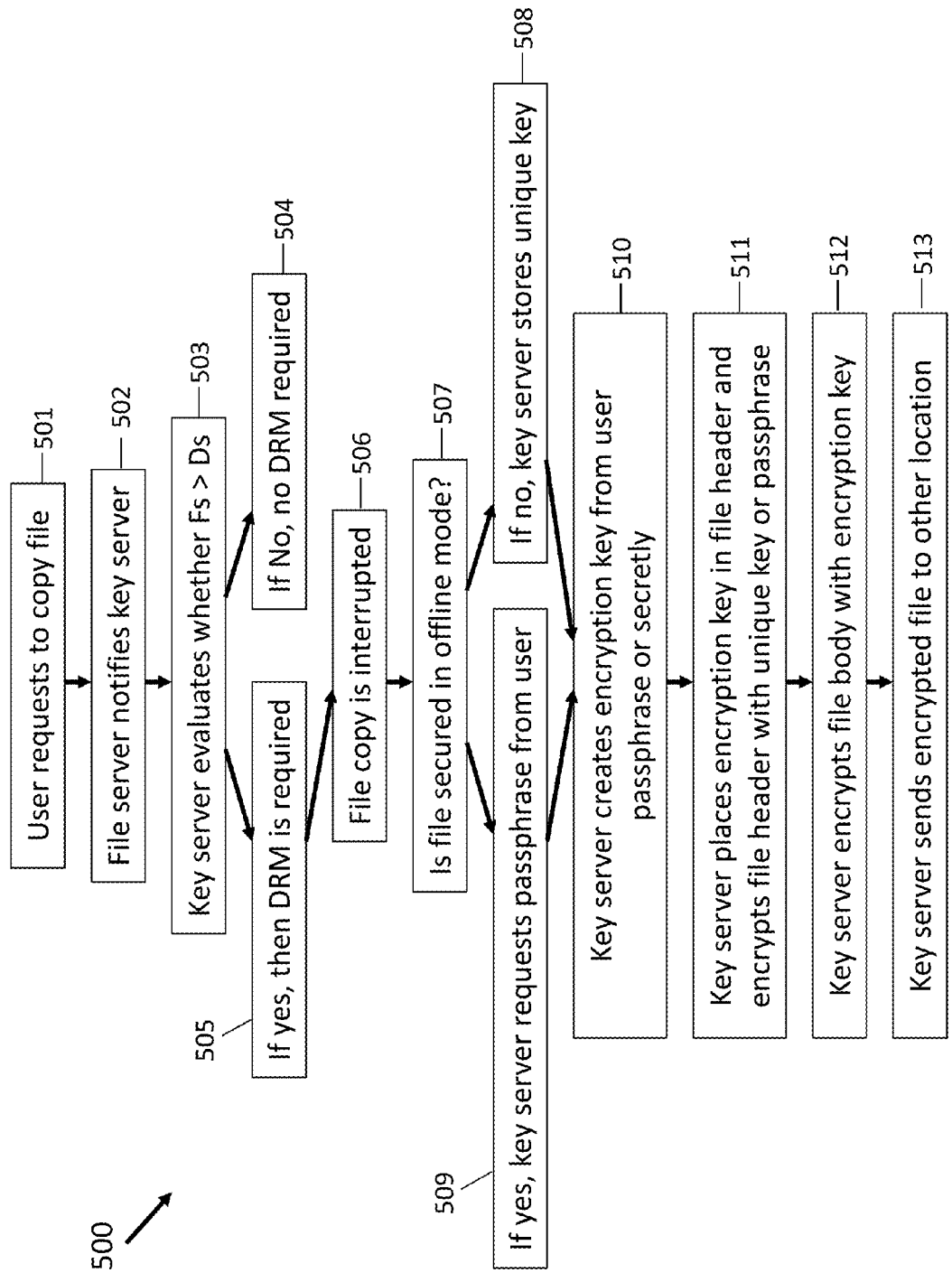
FIG. 5 is an exemplary flow diagram for providing encryption.

In operation, referring to FIG. 5, a process 500 for providing encryption using the system 100 and/or 200 includes the stages shown. Process 500 can be used with system 100 and with system 200. The process 500, however, is exemplary only and not limiting. The process 500 can be altered, e.g., by having stages added, removed, altered, or rearranged. In the below description, while the use of process 500 with system 200 is addressed, the operation of process 500 using the system 100 can be similar.

At step 501, the user can make a request to the file server 103 to copy a file. At step 502, the file server 103 can notify the key server 102 that a file copy request for file 205, to be copied from file server 103 to device 206, has been made. At step 503, the key server can evaluate whether Fs>Ds (e.g., if the security level of the file at the source, file server 103, is greater than the security level at the target location, in this case device 206). At step 504, if Fs is not greater than Ds, no DRM is required for the file 205, and the encryption process exits, allowing the file copy operation to proceed. At step 505, if Fs is greater than Ds, then DRM can be required and the process 500 continues to step 506. At step 506, the user's file copy operation can be interrupted in order to prevent the copying of an unprotected copy of the file 205 to the device 206.

At step 507, the key server 102 can determine whether the file 205 is to be secured in an offline mode, based on user intervention, system policies, system administrator input, designations on the file, or other factors. At step 508, if the file 205 is to be encrypted in an offline mode, the key server 102 can store the unique key used for encrypting the header and does not send it to the user. The user can subsequently access the unique key or passphrase indirectly by performing session-based authentication with the key server 102, which can provide the unique key to the software in a manner that does not allow the user to save or access the key. At step 509, if the file is to be encrypted in an online mode, the key server 102 can request a passphrase from the user, to be input at user device 206, which can be used for encrypting the header.

At step 510, the key server 102 creates the encryption key from the user passphrase or secretly, depending on whether the file is to be encrypted in an offline or online mode. Keys can be created secretly, in some embodiments, when a key is generated at the key server 102 without input from the user and without informing the user of the key once the key is generated. In some embodiments, this can involve the use of a private key for generation of the encryption key, where the private key is stored at the key server 102 and not accessible by the user. At step 511, the key server 102 places the encryption key in the file header of file 205 (see file header 302) and encrypts the file header with the unique key or passphrase. At step 512, the key server 102 can encrypt the file body of file 205 (see file body 304) with the encryption key. At step 513, the key server 102 sends the now-encrypted file (shown by the lock symbol on file 205) to the device 206.

In some embodiments, it may be desirable to use an offline mode. The offline mode may be used when a user requires access to a file outside of the protected area of the network, but is unable or unwilling to connect to the key server 102 using an encrypted session. This may be the case particularly when sending files to a mobile device, such as a laptop or smartphone, as the user may have only intermittent network connectivity to the key server 102. However, in certain embodiments, eligibility may be restricted for certain files, certain users, or certain mobile devices based on a number of factors, including general system policies, per-user policies, per-file policies, and other factors. Offline mode may be less secure than online mode, as access to the encrypted file is given to the user by storing the key to the encrypted body in the DRM header and storing the key to the DRM header on the user device. In contrast, in online mode, the key to the DRM header is not stored on the user device, but is only transmitted, transiently used for decryption, and then destroyed without non-transient storage on the user device. Since offline mode may be less secure, a system administrator may choose to use online mode DRM protection for files that require a higher level of security. In some embodiments, this may be automatically determined based on the file security rating, Fs.

Figure 6:
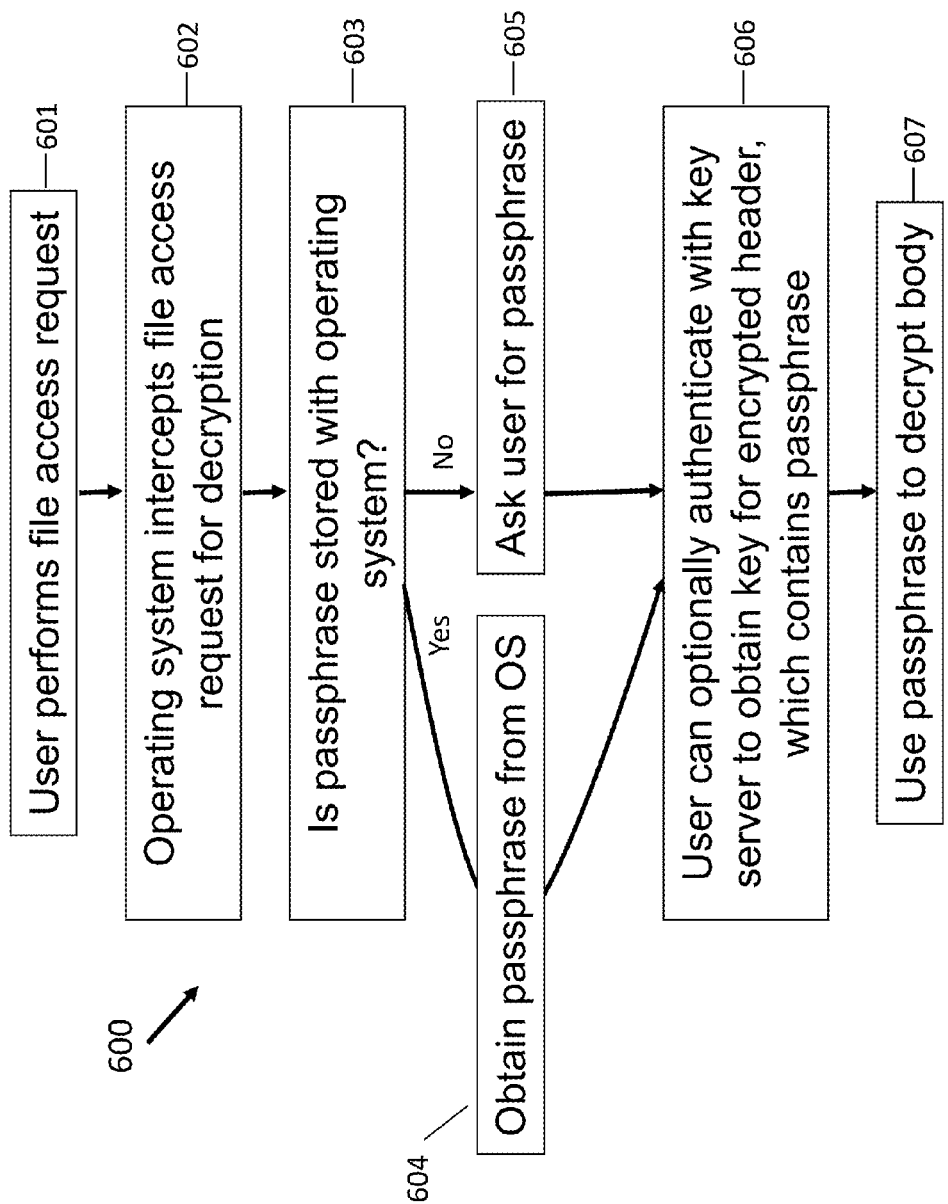
FIG. 6 is an exemplary flow diagram for providing decryption in an offline mode.

In operation, referring to FIG. 6, a process 600 for providing decryption in an offline mode using the system 200 includes the stages shown. The process 600, however, is exemplary only and not limiting. The process 600 can be altered, e.g., by having stages added, removed, altered, or rearranged.

At step 601, the user can request access to an encrypted file residing on a local device 206. At step 602, the operating system preferably intercepts the file access request in order to attempt decryption of the file. At step 603, the operating system can determine whether the passphrase is stored with the operating system. This can be the case in some embodiments where the operating system is enabled to store passwords for the user, and/or where the operating system on the local device is used to automatically generate the passphrase. At step 604, the stored password can be retrieved from the operating system in the case that it is stored. At step 605, if the password is not stored, the user is requested to provide the passphrase. Passphrases in the online mode can consist of plain-language phrases of arbitrary length. These passphrases can be conformed to a particular organization's password policy in some embodiments. In the offline mode, the user can be requested to provide the passphrase at the time the DRM is applied, and in such cases can be asked to provide the passphrase at decryption time. At step 606, the user can optionally authenticate with key server 102 to obtain a key for encrypted header, which contains the passphrase. At step 607, the passphrase is used to decrypt the encrypted body of the file.

Figure 7:
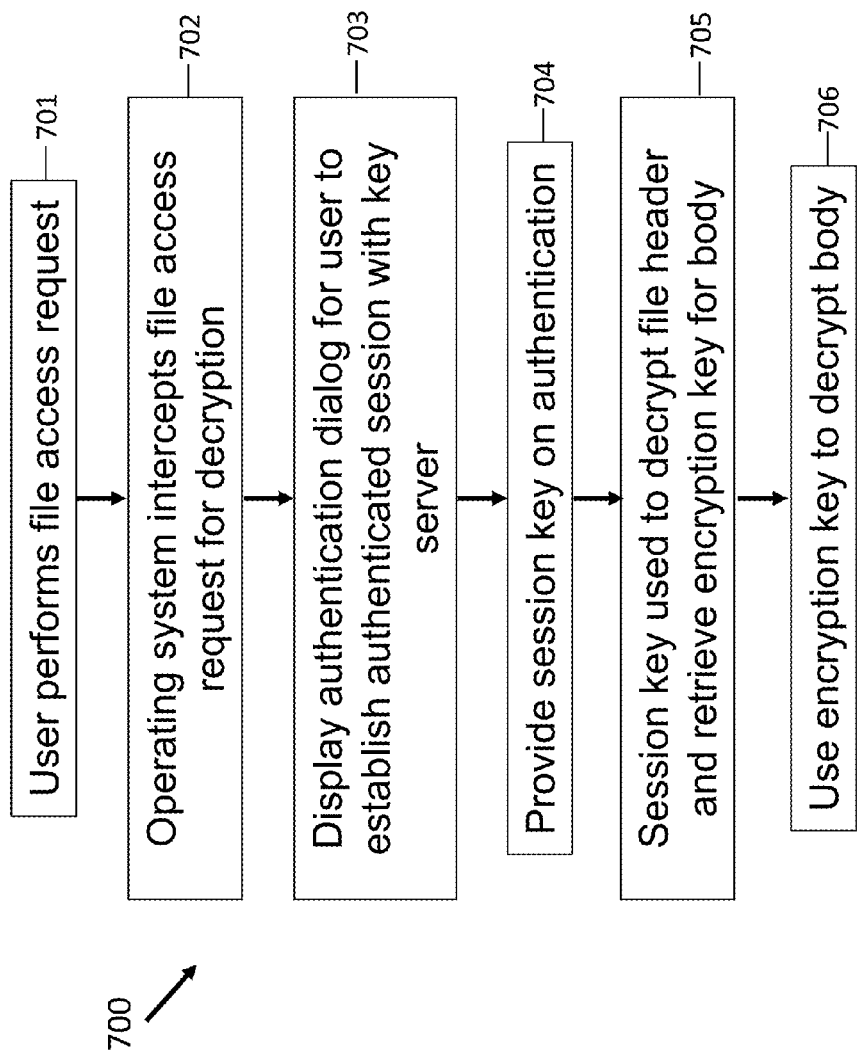
FIG. 7 is an exemplary flow diagram for providing decryption in an online mode.

In operation, referring to FIG. 7, a process 700 for providing decryption in an online mode using the system 200 includes the stages shown. The process 700, however, is exemplary only and not limiting. The process 700 can be altered, e.g., by having stages added, removed, altered, or rearranged.

At step 701, the user can request access to an encrypted file residing on a local device 206. At step 702, the operating system preferably intercepts the file access request in order to attempt decryption of the file. At step 703, an authentication dialog (e.g., as exemplified by FIG. 4) can be displayed for the user to establish authenticated session with the key server. At step 704, the session key can be provided by the key server 102 once the user properly performs session-based authentication. This session key can be prohibited from being stored on the local device to provide session-based security, in some embodiments. At step 705, the session key can be used to decrypt the file header and to retrieve the encryption key for the encrypted file body. The encryption key in an online mode is unlikely to be a plain-language passphrase; instead, it is likely to be an algorithmically-generated string of bits generated by the key server at encryption time, where a longer bit string provides more security. At step 706, the encryption key can be used to decrypt the encrypted body of the file.

Figure 8:
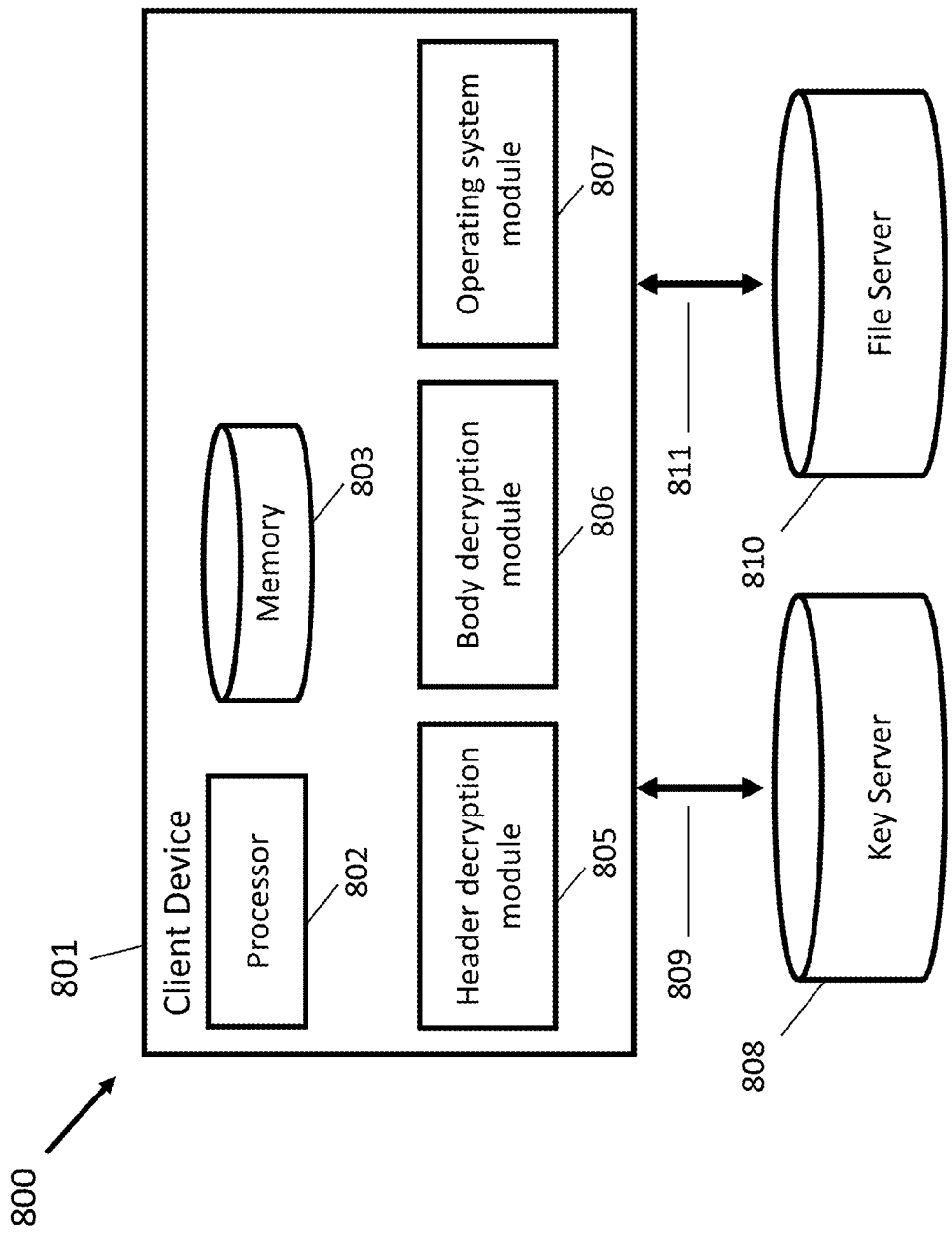
FIG. 8 is an exemplary block diagram of a client device.

FIG. 8 illustrates an exemplary block diagram of system 800 that includes client device 801. Client device 801 can include processor 802, memory 803, header decryption module 805, body decryption module 806, operating system module 807, and potentially other modules. In some embodiments, the header decryption module 805 and the body decryption module 806 can be combined into a single module (e.g., if the header and body of a DRM-protected file use the same encryption technology). Alternatively, the header and the body of a DRM-protected file can be protected using different encryption algorithms, which can use two different modules. Operating system module 807 can interact with header decryption module 805 and body decryption module 806 in order to intercept file access requests (e.g., requests to open or write to a file), determine when decryption is necessary, and/or hand control to header decryption module 805 and/or body decryption module 806 as desired. Support for this functionality can be built into the operating system 807, or it can be added as an application or add-in module. Client device 801 can communicate with key server 808 and file server 810 via the network interface 809 and network interface 811, respectively. In some embodiments, this can be the same interface or can be virtual interfaces. In some embodiments, an encrypted file can be stored on client device 801 as a read-only or view-only file.

Figure 9:
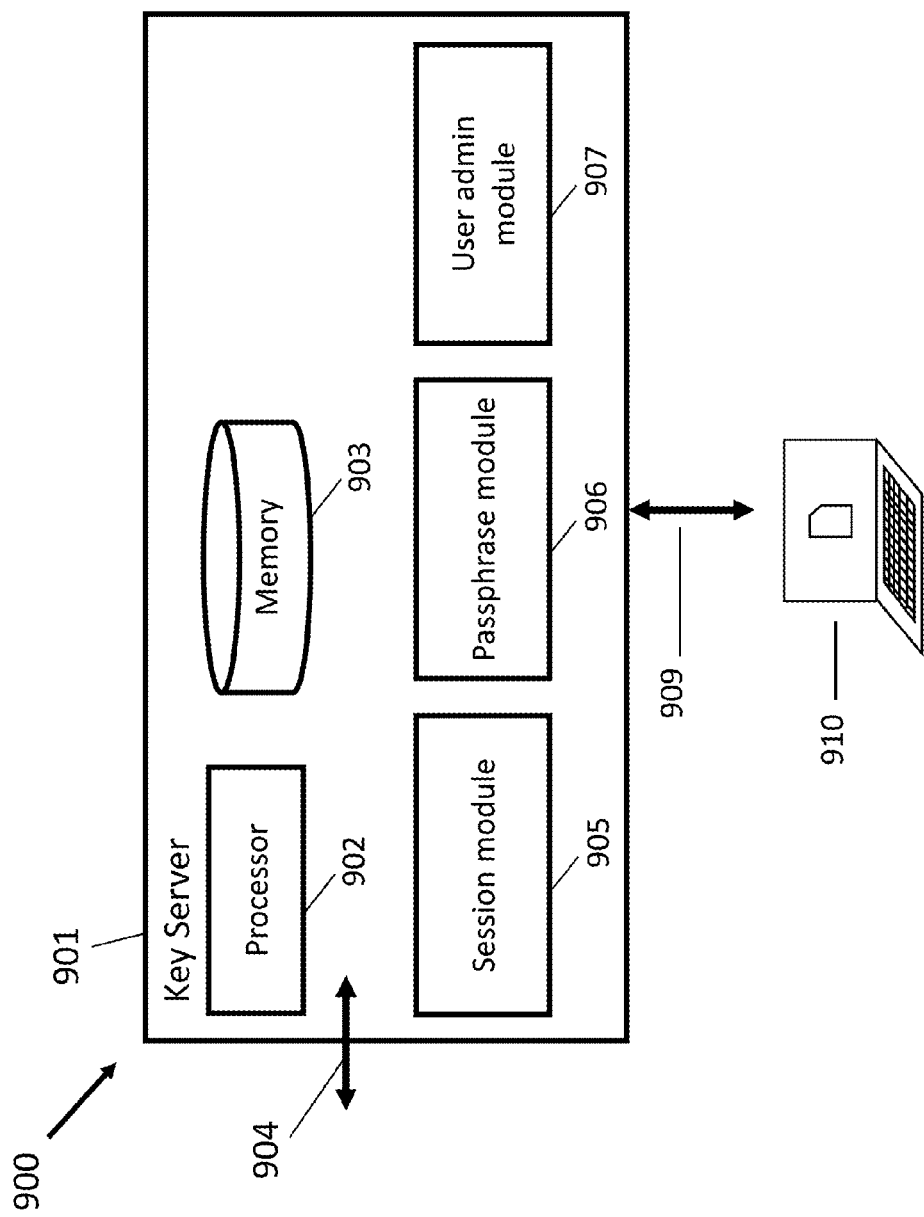
FIG. 9 is an exemplary block diagram of an authentication server device.

FIG. 9 illustrates an exemplary block diagram of authentication server system 900 that includes key server 901. In system 900, key server 901 can include processor 902, memory 903, network interface 904, session module 905, passphrase module 906, user administration module 907, and network interface 909. Network interface 909 can be used for communication with user device 910 over a network connection. Processor 902 and memory 903 can be used in conjunction with modules 905, 906, and 907 to perform various functions such as establishing sessions for authentication with a user device and providing a forgot-password reset function, along with the core function of storing and retrieving security keys and sending and receiving them to and from user device 910. Session module 905 can be used for keeping track of user sessions between multiple client devices, such as user device 910, and key server 902. Session tracking can allow access to sensitive files to be revoked in some embodiments. Passphrase module 906 can be used for storing and retrieving passphrases for protected files, and for associating specific files with their passphrases. User administration module 907 can be used for allowing users to reset forgotten passphrases, to allow users to set passphrases for use with the offline mode described above, and for other basic functions such as user login functions. Network interface 904 can be used to communicate with file server 103 (not shown) in some embodiments. For example, file server 103 can inform and/or notify key server 902 when a file is about to be copied from a protected location to an insecure location, thereby enabling key server 902 to step in and automatically apply DRM to the file. In some embodiments, file server 103 can be modified or enhanced with additional software or hardware to facilitate communication with key server 901. If the user forgets a passphrase, user administration module 907 can provide the key needed to decrypt the file header, and can optionally require the user to select a new passphrase and re-encrypt the file.

Processor 902 can be configured to implement the functionality described herein using computer executable instructions stored in a temporary and/or permanent non-transitory memory (e.g., memory 904). For example, the non-transitory memory can be flash memory, a magnetic disk drive, an optical drive, a programmable read-only memory (PROM), a read-only memory (ROM), or any other memory or combination of memories. The processor 902 can be a general purpose processor and/or can also be implemented using an application specific integrated circuit (ASIC), programmable logic array (PLA), field programmable gate array (FPGA), and/or any other integrated circuit.

Interface 904 and interface 909 can be the same interface or different interfaces. Interfaces 904 and 909 can allow key server 901 to communicate with other systems, such as other devices on one or more networks, server devices on the same or different networks, or user devices either directly or via intermediate networks. Interfaces 904 and 909 can be implemented in hardware to send and receive signals in a variety of mediums, such as optical, copper, and wireless, and in a number of different protocols some of which may be non-transient.

Key server 901 can operate using an operating system (OS) software. In some embodiments, the OS software is based on a Linux software kernel and runs specific applications in the server such as monitoring tasks and providing protocol stacks, although other operating system can be used. The OS software can allow server resources to be allocated separately for control and data paths. For example, certain packet accelerator cards and packet services cards can be dedicated to performing routing or security control functions, while other packet accelerator cards/packet services cards can be dedicated to processing user session traffic. As network requirements change, hardware resources can be dynamically deployed to meet the requirements in some embodiments.

The software in key server 901 can be divided into a series of tasks that perform specific functions. These tasks can communicate with each other as desired to share control and data information throughout key server 901. A task can be a software process that performs a specific function related to system control or session processing. Three types of tasks can operate within key server 901 in some embodiments: critical tasks, controller tasks, and manager tasks. The critical tasks can control functions that relate to the server's ability to process calls such as server initialization, error detection, and recovery tasks. The controller tasks can mask the distributed nature of the software from the user and perform tasks such as monitoring the state of subordinate manager(s), providing for intra-manager communication within the same subsystem (as described below), and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem can be a software element that either performs a specific task or is a culmination of multiple other tasks. A single subsystem includes critical tasks, controller tasks, and manager tasks. Some of the subsystems that run on key server 901 include a system initiation task subsystem, a high availability task subsystem, a shared configuration task subsystem, and a resource management subsystem.

The system initiation task subsystem can be responsible for starting a set of initial tasks at system startup and providing individual tasks as needed. The high availability task subsystem can work in conjunction with the recovery control task subsystem to maintain the operational state of key server 901 by monitoring the various software and hardware components of key server 901. Recovery control task subsystem can be responsible for executing a recovery action for failures that occur in key server 901 and receives recovery actions from the high availability task subsystem. Processing tasks can be distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will preferably not be affected by that problem.

Shared configuration task subsystem can provide the server 900 with an ability to set, retrieve, and receive notification of server configuration parameter changes and is responsible for storing configuration data for the applications running within the server 900. A resource management subsystem can be responsible for assigning resources (e.g., processor and memory capabilities) to tasks and for monitoring the task's use of the resources.

In some embodiments, key server 901 can reside in a data center and form a node in a cloud computing infrastructure. Key server 901 can also provide services on demand such as Kerberos authentication, HTTP session establishment and other web services, and other services. A module hosting a client can be capable of migrating from one server to another server seamlessly, without causing program faults or system breakdown. A key server 901 in the cloud can be managed using a management system.

Other embodiments are within the scope and spirit of the invention(s).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

What is claimed is:

1. A computerized method for encrypting electronic files during a transfer to a low-security storage location, the method comprising:
    receiving a file copy request for a file stored on a source storage system to be copied to a destination storage system;
    determining a desired file security level of the file, the file security level based on a desired security level for the file when the file is accessed;
    determining a destination security level of the destination storage system;
    comparing the file security level and the destination security level;
    encrypting the file to create an encrypted file when the destination security level is less than the file security level prior to copying the file, wherein encrypting the file comprises:
        encrypting a file body within the file using a first key,
        encrypting a file header within the file using a second key, wherein the file header contains the first key, and
        creating the encrypted file containing the encrypted file body and the encrypted file header; and
    copying at least one of the file and the encrypted file to the destination storage system as a function of the comparison of the file security level and the destination security level.

2. The computerized method of claim 1, further comprising determining the destination security level of the destination storage system based on whether the destination storage system is connected to an enterprise network within an enterprise network firewall.

3. The computerized method of claim 1, further comprising determining the destination security level of the destination storage system based on whether the destination storage system is within a secure network circumscribed by a security threshold boundary.

4. The computerized method of claim 1, further comprising determining the file security level of the file based on a default security level of the source storage system.

5. The computerized method of claim 1, further comprising encrypting the file using a session-based encryption method.

6. An authentication server for encrypting electronic files during a transfer to a low-security storage location, the authentication server comprising:
    a processor; and
    a memory coupled to the processor and including computer-readable instructions that, when executed by the processor, cause the processor to:

receive, from a user device, a request to copy a file to the user device from a file server;

determine a file security level of the file based on a desired security level for the file when the file is accessed;

determine a destination security level of the user device;

encrypt the file to create an encrypted file when the destination security level is less than the file security level prior to copying the file, wherein encrypting the file comprises:

encrypting a file body within the file using a first key, encrypting a file header within the file using a second key, wherein the file header contains the first key, and creating the encrypted file containing the encrypted file body and the encrypted file header; and copy at least one of the file and the encrypted file to the user device as a function of the destination security level.

7. The authentication server of claim 6, the computer-readable instructions further causing the processor to determine the destination security level of the destination storage system based on whether the destination storage system is connected to an enterprise network within an enterprise network firewall.

8. The authentication server of claim 6, the computer-readable instructions further causing the processor to determine the destination security level of the destination storage system based on whether the destination storage system is within a secure network circumscribed by a security threshold boundary.

9. The authentication server of claim 6, the computer-readable instructions further causing the processor to determine the file security level of the file based on a default security level of the source storage system.

10. The authentication server of claim 6, the computer-readable instructions further causing the processor to encrypt the file using a session-based encryption method.

11. A computerized method for providing session-based encryption for secure electronic files using a network server on a secure network, the method comprising:

encrypting a file body within a file stored in the secure network using a first key;

encrypting a file header within the file using a second key, wherein the file header contains the first key;

creating an encrypted version of the file containing the encrypted file body and the encrypted file header; and providing the encrypted version of the file to a user device;

providing decryption information to the user device such that the user device can access the file by decrypting the encrypted file header using the second key and decrypting the encrypted file body using the first key stored in the decrypted file header.

12. The computerized method of claim 11, further comprising:

sending a request to the user device from the network server to prompt a user to enter a passphrase;

causing the second key to be generated based on the received passphrase; and encrypting the file header using the second key based on the received passphrase, such that the encrypted file header is subsequently decrypted on the user device using the second key and such that the second key is generated at the user device.

13. The computerized method of claim 12, further comprising storing the received passphrase at the server, and subsequently providing access to the stored passphrase by requiring the user to perform at least one authentication step.

14. The computerized method of claim 13, further comprising:

requesting, subsequent to authentication by the user, a new passphrase;

decrypting the encrypted header using the stored passphrase;

re-encrypting the decrypted header with the new passphrase; and transmitting the re-encrypted header to the user device, such that the encrypted file is usable in an offline mode.

15. The computerized method of claim 12, further comprising intercepting file access requests at the user device to transparently decrypt files in an offline mode.

16. The computerized method of claim 11, further comprising:

storing the second key at the network server;

establishing an authenticated session with the user device over a network;

in response to a request for the second key, copying the second key to the user device over the authenticated session; and removing the copy of the second key from the user device subsequent to using the second key for decrypting the encrypted version of the file, such that decryption of the encrypted version of the file requires a session to be established with the network server over the network.

17. The computerized method of claim 11, further comprising requiring the user to authenticate each time the authenticated session is timed out, thereby requiring the user to maintain an active session with the network server in order to access the file contents.

18. The computerized method of claim 11, further comprising determining a destination security level of the user device based on whether the user device is connected to an enterprise network within an enterprise network firewall, and requiring encryption based on the destination security level of the user device.

19. The computerized method of claim 18, further comprising determining the destination security level of the user device based on whether the user device is within a secure network circumscribed by a security threshold boundary.

20. The computerized method of claim 18, further comprising determining a file security level of the file based on a default security level.

* * * * *